United States Patent
Cardona De Leon et al.

(10) Patent No.: US 12,260,415 B2
(45) Date of Patent: Mar. 25, 2025

(54) AUDITING USER FEEDBACK DATA

(71) Applicant: PAYPAL, INC., San Jose, CA (US)

(72) Inventors: Juan Jose Cardona De Leon, Guatemala (GT); Ramiro Asturias Pena, Guatemala (GT)

(73) Assignee: PAYPAL, INC., San Jose, CA (US)

( * ) Notice: Subject to any disclaimer, the term of this patent is extended or adjusted under 35 U.S.C. 154(b) by 312 days.

(21) Appl. No.: 18/055,556

(22) Filed: Nov. 15, 2022

(65) Prior Publication Data

US 2024/0161123 A1  May 16, 2024

(51) Int. Cl.
*G06Q 30/016* (2023.01)
*G06F 16/35* (2019.01)
*G06F 40/30* (2020.01)

(52) U.S. Cl.
CPC .......... *G06Q 30/016* (2013.01); *G06F 16/35* (2019.01); *G06F 40/30* (2020.01)

(58) Field of Classification Search
CPC ........ G06Q 30/016; G06F 16/35; G06F 40/30
See application file for complete search history.

(56) References Cited

U.S. PATENT DOCUMENTS

| | | | | |
|---|---|---|---|---|
| 2013/0110498 A1* | 5/2013 | Bekkerman | ........... | G06F 40/205 704/9 |
| 2014/0297261 A1* | 10/2014 | Sayers | .................. | G06F 40/279 704/9 |
| 2017/0004205 A1* | 1/2017 | Jain | ........................ | G06N 5/022 |
| 2018/0060211 A1* | 3/2018 | Allen | ................... | G06F 11/0781 |
| 2018/0075368 A1* | 3/2018 | Brennan | ................ | G06N 5/022 |
| 2018/0349388 A1* | 12/2018 | Skiles | ..................... | G06F 16/358 |
| 2018/0373696 A1* | 12/2018 | Terry | ........................ | G06N 5/02 |
| 2020/0126533 A1* | 4/2020 | Doyle | .................. | G10L 15/063 |
| 2020/0387675 A1* | 12/2020 | Nugent | .................. | G06N 3/045 |
| 2021/0043192 A1* | 2/2021 | Banko | ................. | G06F 18/2431 |
| 2021/0133286 A1 | 5/2021 | Yang et al. | | |
| 2021/0304749 A1* | 9/2021 | Singh | ...................... | G06F 40/30 |
| 2022/0114594 A1 | 4/2022 | Nunes et al. | | |
| 2022/0253728 A1* | 8/2022 | Lin | ...................... | G06F 40/237 |
| 2023/0110127 A1* | 4/2023 | Shetty | ................... | G06F 40/295 704/9 |

* cited by examiner

*Primary Examiner* — Brian L Albertalli
(74) *Attorney, Agent, or Firm* — Haynes and Boone, LLP (57) ABSTRACT

Methods and systems are presented for auditing user feedback data corresponding to user communications received via at least one interface of a service provider. The user feedback data includes a first set of feedback categories associated with a first classification of the user communications. A first feature representation of the communications is generated from the user feedback data. The first feature representation includes a first set of textual data features extracted from the communications. A second feature representation is generated from the first feature representation using a first machine learning model. The second feature representation includes a second set of textual data features including semantic equivalents of the first set of features. A second machine learning model is trained with the second feature representation. A second classification of the user communications according to a second set of feedback categories is generated using the trained second machine learning model.

20 Claims, 5 Drawing Sheets

AUDITING USER FEEDBACK DATA

TECHNICAL FIELD

The present application generally relates to data analysis and classification using trained machine learning models, and particularly, to the analysis and classification of user feedback data using trained machine learning models.

BACKGROUND

An online service provider that provides electronic services, such as electronic content access, electronic transactions, etc., may offer numerous avenues for users to interact with the online service provider. For example, users may interact with the online service provider by accessing a website or a mobile application associated with the online service provider. In another example, the user may call a customer support hotline, send emails to a designated email address, or chat with an agent (or a chatbot) of the online service provider via a chat application. These various avenues provide convenient ways for users to communicate with the online service provider for submitting transaction claims (e.g., disputes, questions, or other requests) related to products and services offered by the service provider. However, they also present technical problems for the service provider due to the large volume of claims that need to be processed and evaluated to effectively understand the reasons for such claims and address any underlying issues to help improve the associated product or service.

Conventional customer relationship management (CRM) systems are not equipped to manage the large amounts of data associated with the large volume of claims. For example, each transaction claim may have accompanying data, such as text, audio, picture(s), video(s), etc., that the user has provided as feedback for the transaction. A text comment in the transaction claim may contain, for example, text information describing a problem encountered by a user for a recent transaction or a reason why the user has requested certain transaction changes or cancellation. The service provider may receive numerous transaction claim submissions (e.g., hundreds of transaction claims) from different users every day. The transaction claims are often manually classified by customer service agents of the service provider, who also input the user feedback as text data associated with each claim. In many cases, however, the transaction claims are misclassified, and the associated text data is inconsistent with the user's actual comments. Because of such classification errors and data inconsistencies, conventional systems have proved ineffective in resolving many of the transactions claims received by a service provider for its product or service and in addressing any underlying issues associated with the product or service.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

It should be appreciated that like reference numerals are used to identify like elements illustrated in one or more of the figures, wherein showings therein are for purposes of illustrating implementations of the present disclosure and not for purposes of limiting the same.

DETAILED DESCRIPTION

Embodiments of the present disclosure are directed to auditing user feedback data for improved classification of user communications using machine learning models. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

Further, when a particular feature, structure, or characteristic is described in connection with one or more embodiments, it is submitted that it is within the knowledge of one skilled in the relevant art to implement such feature, structure, or characteristic in connection with other embodiments whether or not explicitly described. It would also be apparent to one of skill in the relevant art that the embodiments, as described herein, can be implemented in many different embodiments of software, hardware, firmware, and/or the entities illustrated in the drawings. Any actual software code with the specialized control of hardware to implement embodiments is not limiting of the detailed description. Thus, the operational behavior of embodiments will be described with the understanding that modifications and variations of the embodiments are possible, given the level of detail presented herein.

As will be described in further detail below, embodiments of the present disclosure may be used to provide an auditing service or tool for automated analysis and classification of user feedback data corresponding to user communications received via at least one communications interface of a service provider. In some embodiments, the user feedback data may include a set of feedback categories associated with an initial classification of the user communications. The initial classification may be performed by, for example, customer service agents (people or machines, e.g., an ML based classifier) of the service provider based on user comments received via the communications interface. The communications interface may be, for example, a customer service interface implemented using any of various communication channels that users of the service provider may utilize to submit feedback or requests related to one or more of the service provider's products or services. Examples of user communications that may be submitted via such channels include, but are not limited to, user emails directed to a dedicated e-mail address associated with the service provider, user chat sessions via a chat application or chat interface of a website associated with the service provider, and user phone calls via a customer support hotline associated with the service provider. Examples of the types of user feedback or requests that may be received by the service provider through these communications (e.g., e-mails, calls, and/or chat sessions) include, but are not limited to, service complaints or feature requests, refund requests, technical support requests, fraud claims, and other types of transaction claims or disputes.

The user feedback data resulting from the initial classification of the user communications in the above example may include a first set of feedback categories that were selected by the customer service agents from a set of predefined or template categories. However, the user communications may have been misclassified due to agent error or predefined categories that do not accurately reflect the users' actual comments or reasons for initiating the communications with the service provider. In some embodiments, various machine learning models may be applied to the user feedback data to reclassify the corresponding user communications and thereby improve the initial classification. The reclassification using the disclosed machine learning techniques may produce a second classification of the user communications according to a second set of feedback categories. The second set of feedback categories may provide a more accurate representation of the user communications. Accordingly, the service provider may use the reclassified user feedback data to gain valuable insight into the underlying issues that concern its users and make any necessary changes or improvements to its product(s) or service(s). The auditing and reclassification of the user feedback data may also be used by the service provider to improve its customer service interface, e.g., by training its customer service agents to produce more accurate classifications or by revising the predefined categories to include additional categories that are more specific to the types of issues reported by its customers.

The terms "online service," "web service," and "web application" are used interchangeably herein to refer broadly and inclusively to any type of website, application, service, protocol, or framework accessible via a web browser, or other client application executed by a computing device, over a local area network, medium area network, or wide area network, such as the Internet. In some embodiments, the user feedback data auditing and classification techniques disclosed herein may be implemented as a web application or web service of an online service provider alongside other network or online services offered by the service provider. For example, an online payment service provider may implement the disclosed techniques as part of an auditing tool to gain useful insights into the types of issues that users of its payment processing services are facing and to make any necessary improvements accordingly. While the examples of FIGS. 1-5 will be described below in the context of payment processing services provided by an online payment service provider, it should be appreciated that embodiments are not intended to be limited thereto and that the disclosed techniques may be applied to any type of web service or application provided by a network or online service provider. Also, while various embodiments will be described below in the context of user feedback data received via a customer service interface, it should be appreciated that the disclosed feedback auditing and classification techniques are not intended to be limited thereto and that these techniques may be applied to any type of feedback related to a service provider's product or service. Furthermore, the term "user feedback data" as used herein may refer to feedback data corresponding to communications received from any of various entities (e.g., individuals, merchants, or other online service providers) via an appropriate communications interface (e.g., an email, messaging, or web interface) of the service provider.

Figure 1:
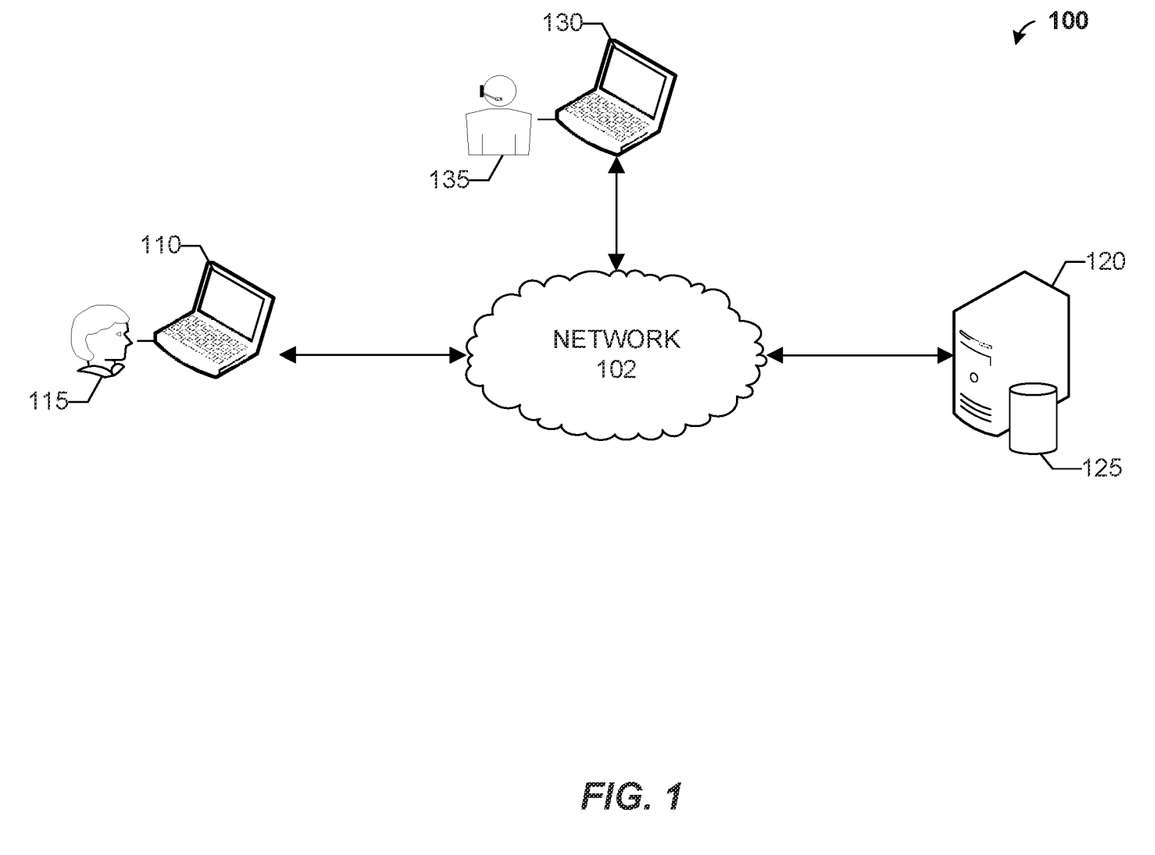
FIG. 1 is a block diagram of a distributed client-server system in accordance with an embodiment of the present disclosure.

FIG. 1 is a block diagram of a distributed client-server system 100 in accordance with an embodiment of the present disclosure. System 100 includes a client device 110, a server 120, and a client device 130, all of which are communicatively coupled to one another via a network 102. Each of devices 110 and 130 may be any type of computing device with at least one processor, local memory, display, and one or more input devices (e.g., a mouse, QWERTY keyboard, touchscreen, microphone, or a T9 keyboard). Examples of such computing devices include, but are not limited to, a mobile phone, a personal digital assistant (PDA), a computer, a cluster of computers, a set-top box, or similar type of device capable of processing instructions. Server 120 may be any type of computing device, e.g., a web server or application server, capable of serving data to devices 110 and 130 over network 102.

Network 102 may be any network or combination of networks that can carry data communication. Such a network may include, but is not limited to, a wired (e.g., Ethernet) or a wireless (e.g., Wi-Fi and 3G) network. In addition, network 102 may include, but is not limited to, a local area network, a medium area network, and/or a wide area network, such as the Internet. Network 102 may support any of various networking protocols and technologies including, but not limited to, Internet or World Wide Web protocols and services. Intermediate network routers, gateways, or servers may be provided between components of system 100 depending upon a particular application or environment. It should be appreciated that the network connections shown in FIG. 1 are illustrative and any means of establishing a communications link between the computers may be used. The existence of any of various network protocols such as TCP/IP, Ethernet, FTP, HTTP, and the like, and of various wireless communication technologies such as GSM, CDMA, Wi-Fi, and LTE, is presumed, and the various computing devices described herein may be configured to communicate using any of these network protocols or technologies.

In some embodiments, server 120 may be used by a service provider to provide one or more online services. For example, the service provider may provide a payment processing service for processing payments in connection with online transactions between different entities via network 102. Such transactions may include, but are not limited to, payments or money transfers between different users of the service provider. In FIG. 1, for example, a user 115 of device 110 may initiate a transaction for the purchase of one or more items sold by a merchant (not shown) at a physical store or via an online marketplace accessible over network 102. The online marketplace in this example may be accessed by user 115 by visiting a corresponding website through a web browser or other client application executable at device 110. The online marketplace may provide a checkout option for user 115 to select the payment processing service offered by the service provider at server 120 to complete payment for the purchase. By selecting this option, user 115 may initiate a payment transaction for transferring funds to the merchant from a specified bank account, digital wallet, or other funding source associated with an account of user 115 with the service provider. The payment processing service may assist with resolving electronic transactions through validation, delivery, and settlement of account balances between user 115 and the merchant in this example, where accounts may be directly and/or automatically debited and/or credited using monetary funds in a manner accepted by the banking industry.

To use the payment processing service, user 115 may need to provide authentication credentials associated with an account of user 115 with the service provider, e.g., via a login page served by server 120 and displayed at device 110. Server 120 may check the credentials, as received from user 115 and device 110 via network 102, against the credentials associated with user 115's account. The authentication credentials may be stored along with other relevant account information, e.g., a transaction history associated with user 115's account, in a database 125 coupled to or otherwise accessible to server 120. Database 125 may be any type of data store or recordable storage medium used to maintain, store, retrieve, and update information for server 120.

In some embodiments, server 120 may also be used by the service provider to implement an auditing tool for user feedback data associated with the payment processing service. The user feedback data may correspond to communications received from different users, including user 115, of the service provider. Such user communications may be received by the service provider via, for example, at least one communications interface of server 120. The communications may include, for example, user feedback and customer service requests related to the services offered by the service provider. The user feedback may include, for example, user complaints or reports of issues related to one or more service features. Customer service requests may include requests for assistance resolving issues related to the users' respective accounts or transactions. Examples of such requests include, but are not limited to, technical support requests (e.g., account login or access issues), refund requests, fraud claims, and other types of transaction claims or disputes (e.g., requests for canceling a specific transaction or making appropriate changes to the transaction amount or other relevant transaction details).

In some embodiments, the communications interface may be one of various customer service interfaces that allow users to communicate with the service provider via different communication channels and submit their feedback in different ways. Examples of such communication channels or interfaces include, but are not limited to, telephone, email, and text or instant messaging (IM). Accordingly, client device 110 may include, for example, voice, email, and messaging (or chat) applications that allow user 115 to send and receive calls, emails, texts, and other notifications over network 102.

For example, the customer service interface may be in the form of a customer support line of the service provider. Client device 110 in this example may be a smart phone or other mobile communication device with appropriate hardware and software that user 115 may use to place a phone call to the support line. The call may be answered by an automated telephony system, e.g., an interactive voice response (IVR) system, implemented at server 120 or other network device associated with the service provider. The telephony system may obtain relevant information for identifying user 115 and account thereof before routing the call via network 102 to a device of a customer service agent associated with the service provider. The customer service agent in this example may be a user 135 of client device 130. In another example, user 135 may be a machine or software, such as an AI or ML based chatbot application, operating with or within client device 130. Client device 130 may execute one or more applications for accessing information associated with user 115's account and capturing user feedback data including a record of user 115's communications. The record may include, for example, text input by user (or agent) 135 based on comments made by user 115 during the call and an audio recording of the call itself.

In some embodiments, the user feedback data may also include a first set of feedback categories selected by user/agent 135 (e.g., from a predefined list of categories) as part of an initial classification of user 115's communications or feedback. The user feedback data, including the call record and feedback categories, may be transmitted to server 120 via network 120. It should be appreciated that a similar classification may be performed by customer service agents of the service provider for user communications received via other types of communication channels or interfaces, e.g., user communications received via email and/or chat sessions.

Moreover, it should be appreciated that the disclosed feedback auditing and classification techniques are not intended to be limited to user communications received via a customer service interface and that the disclosed techniques may be applied to any type of feedback related to the service provider's product or service. Such feedback may correspond to, for example, online communications or information received or obtained by the service provider from any of various sources associated with entities that may or may not be affiliated with the service provider. Examples of affiliated entities include, but are not limited to, merchants, business partners, or other online service providers in a contractual relationship with the service provider. Unaffiliated entities may include, for example, any of various third-party services or content providers (e.g., social media service providers, online news providers, online bloggers, or other public information sources), which publish information (e.g., social media posts, news articles, blog posts, public comments, or other online content) that includes feedback related to the service provider's product or service.

Examples of the types of feedback or communications available from either affiliated or unaffiliated entities include, but are not limited to, product/service updates or reports, new feature requests, marketing-related communications, public chat messages, and product or service ratings. Given the ubiquity of online devices and the wide array of feedback data available to the service provider, the disclosed feedback auditing techniques may be used to analyze and classify (or reclassify) user feedback data. The results of this classification may provide useful insights for the service provider and any affiliated entities (e.g., merchants) to improve existing features of their respective products or services and/or predict market trends for adding new product/service features tailored to different user groups and markets.

In each of the above examples, server 120 may store the user feedback data, including the set of feedback categories, with other account information for user 115, e.g., within database 125, for later access and analysis by the user feedback auditing tool of the service provider. As will be described in further detail below with respect to FIGS. 2-4, the analysis performed by the auditing tool may include applying one or more machine learning models to the user feedback data to reclassify the corresponding user communications according to a second set of feedback categories that improves upon the initial classification.

Figure 2:
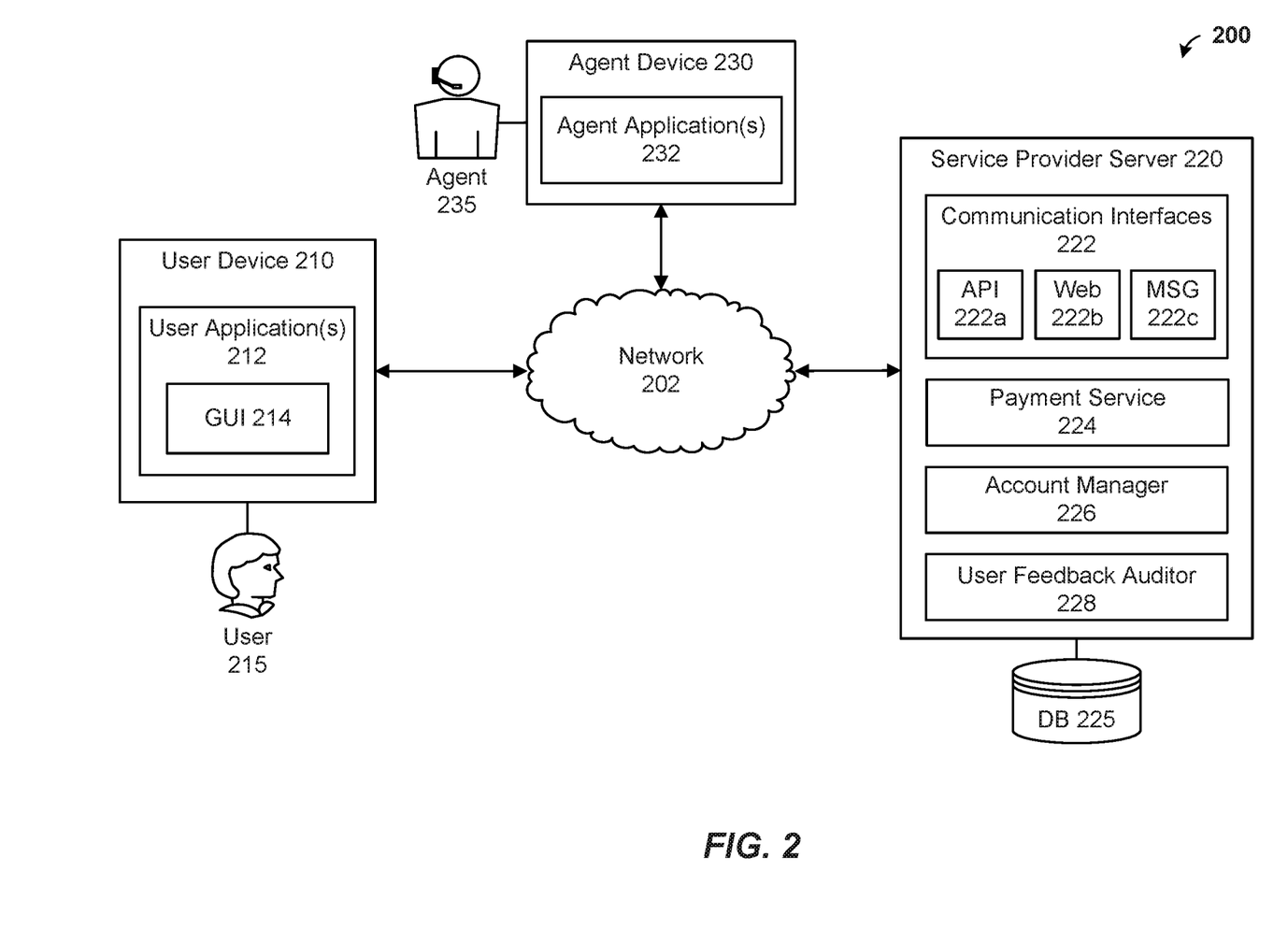
FIG. 2 is a block diagram of a network communication system for auditing user feedback data for improved classification of user communications in accordance with an embodiment of the present disclosure.

FIG. 2 is a block diagram of a network communication system 200 for auditing user feedback data for improved classification of user communications in accordance with an embodiment of the present disclosure. For discussion purposes, system 200 will be described using system 100 of FIG. 1, as described above, but system 200 is not intended to be limited thereto. As shown in FIG. 2, system 200 includes a user device 210, a service provider server 220, and an agent device 230. User device 210 and agent device 230 may be implemented using, for example, client devices 110 and 130 of FIG. 1, respectively, as described above. Server 220 may be implemented using, for example, server 120 of FIG. 1, as described above. Devices 210 and 230 along with server 220 may be communicatively coupled to one another via a network 202. Network 202 may be implemented using, for example, network 102 of FIG. 1, as described above.

In some embodiments, user device 210 executes one or more user applications 212 that a user 215 may use to access the functionality of one or more web services via network 202. Such web services may include, for example, a payment service 224 provided by a service provider using service provider server 220. In some embodiments, the service provider may be an online payment service provider or payment processor, and payment service 224 may include various payment processing services for transactions between different entities. Such transactions may include, for example, transactions between user 215 and a merchant (not shown) for the purchase of items sold by the merchant via an online marketplace or physical point-of-sale location. The payment processing services offered by the service provider in this example may include, but are not limited to, payment account establishment and management, fund transfers, digital wallet services, and reimbursement or refund services.

In some embodiments, user application(s) 212 may include any of various application programs executable at user device 210 for accessing different features of payment service 224 via a website hosted by service provider server 220. Examples of such application programs include, but are not limited to, a web browser, a text messaging application, an instant messaging (IM) application, a contacts application, a calendar application, an electronic document application, a database application, a media application (e.g., music, video, television), a location-based services (LBS) application (e.g., GPS, mapping, directions, geolocation, point-of-interest locator, etc.) that may utilize hardware components such as an antenna, and a banking or other financial application. In some implementations, application(s) 212 may include a client-side payment service application that interfaces with service provider server 220 over network 202 to facilitate various transactions, e.g., online payment or point-of-sale transactions, initiated by user 215 with user device 210. Such a client-side service application may be used to implement security and programmatic features for communicating over network 202 with various communication interfaces 222 of service provider server 220, as will be described in further detail below, or other executable applications of user device 210, e.g., email, voice, texting, and IM applications that allow user 215 to send and receive emails, calls, texts, and other notifications through network 202.

User 215 may interact with a graphical user interface (GUI) 214 of the respective user application(s) 212 using a user input device (e.g., mouse, keyboard, or touchscreen) of user device 210 to perform various tasks related to payment service 224. Such tasks may include, for example, logging into an account of user 215 with the service provider, viewing account information, initiating payment transactions using funds associated with user 215's account, and communicating with the service provider to submit feedback or request customer service assistance with issues related to one or more features of payment service 224. Examples of such user communications include, but are not limited to, bug reports, complaints, questions, suggestions, feature requests, technical support requests, and customer service requests. The customer service requests may include, for example, transaction claims or disputes related to a pending or completed transaction associated with user 215's account.

In some embodiments, service provider server 220 may receive communications (e.g., complaints or transaction claims/disputes) from user 215 and other users of payment service 224 through various communication interfaces 222. Communication interfaces 222 may be used to provide various communication channels over network 202 using the appropriate communication protocols supported by different user applications 212. Communication interfaces 222 may include, for example, an application programming interface (API) 222a, a web interface 222b, and a messaging (MSG) interface 222c. API 222a may be used to provide a programmatic interface for receiving user communications through one or more user application(s) 212, e.g., a client-side service application, as described above. Web interface 222b may be used to receive user communications via appropriate World Wide Web protocols supported by web-based applications e.g., a web browser or a Voice over Internet Protocol (VoIP) telephone application. Messaging interface 222c may be used to receive user communications via email or other electronic messaging applications using appropriate messaging protocols, e.g., Simple Mail Transfer Protocol (SMTP), instant message (IM), short message service (SMS), multimedia messaging service (MMS), Internet Relay Chat (IRC), and the like. It should be appreciated that API 222a, web interface 222b, and messaging interface 222c may be structured, arranged, and/or configured to communicate with any of various types of user devices 210 or user applications 212 over network 202 and that these interfaces may interoperate with each other in some implementations. It should also be appreciated that embodiments are not limited to the types of communication interfaces or channels illustrated in FIG. 2 and that any of various interfaces may be used for sending and receiving different types of communications to and from user devices and applications, as desired for a particular implementation. Such communications may include, for example, user discussions related to the service provider's product(s) or service(s) (e.g., payment service 224) from a social media platform accessible to service provider server 220 via network 202.

In some implementations, communication interfaces 222 may correspond to different customer service interfaces of the service provider for receiving user feedback and customer service requests related to features of payment service 224. User 215 may interact with one or more user applications 212 at user device 210 to submit feedback or a customer service request via one or more communications interfaces 222 of service provider server 220. In one example, user 215 may use an email application executable at user device 210 to send an email including the feedback or request to a dedicated email address for customer service or support issues associated with payment service 224. The email from user device 210 may be received by service provider server 220 over network 202 via messaging interface 222c. In another example, user 215 may use a VoIP telephone application at user device 210 to place a phone call over network 202 to a dedicated customer support/service line associated with payment service 224. The call may be received by service provider server 120 via web interface 222b or other interface (e.g., API 222a) that provides various telephony (e.g., IVR and web-based telephone) services and features at service provider server 120.

In some embodiments, the user communications (e.g., email or phone call) received by service provider server 220 via communication interfaces 222 may be routed over network 202 to an agent device 230. Agent device 230 may execute one or more agent applications 232 that allows a customer service representative or agent 235 (similar to user 135), who may be one of various customer service agents (not shown) associated with the service provider, to receive or review the communications from user 215 (e.g., text and any audio or visual media included in a user email), and input notes related to the communications (e.g., a text summary of the email content or comments made by user 215 during the phone call).

In the phone call example above, agent application(s) 232 may include VoIP functionality that lets agent 235 receive a notification of an incoming call from user 215 and answer the call to communicate directly with user 215, e.g., via a virtual telephone using a microphone and speaker of agent device 230 or a physical telephone connected to agent device 230. It should be appreciated that agent device 230 may include any of various types of communication hardware or software to facilitate voice communications with user 215 and other remote users over network 202, as necessary or desired for a particular implementation. Agent 235 in this example may interact with a GUI of agent application(s) 232 to communicate with user 215, view relevant information associated with the communications, and input notes and other data related to the communications (e.g., a text summary of comments made by user 215 during a phone call with agent 235). The notes and other data may be stored as part of a transaction record associated with user 215's account. The transaction record may be stored along with other account information for user 215 within a database (DB) 225.

In some embodiments, the account information stored in DB 225 may be managed by an account manager 226 of service provider server 220. DB 225 may be any type of data store for storing information accessible to service provider server 220. DB 225 may be implemented using, for example, database 125 of FIG. 1, as described above. In some embodiments, account information for each registered user of the service provider may be stored in DB 225 with a unique identifier and other information relevant to each user account. Such account information may include, for example and without limitation, login credentials (e.g., username and password information), personal contact information (e.g., mailing address and phone numbers), banking information (e.g., bank account numbers and other information related to one or more funding sources, such as digital wallets), and other identity attributes that may be used by account manager 226 to authenticate or verify the identity of user 215 or other entity associated with an account.

The account information may also include a transaction history that provides a chronological record of the communications (e.g., transaction claims/disputes or other customer service requests) associated with user 215's account with the service provider. The transaction history may include metadata collected during one or more previous transactions processed by the service provider for user 215, including any previous communications received by the service provider from user 215. Such metadata may include, for example and without limitation, information passed to service provider server 220 (and account manager 226) as part of a login, purchase/payment transaction, transaction claim, or customer service request initiated by user 215 via user application(s) 212 at user device 210.

In some embodiments, the information collected during the previous transaction(s) may be used to create a profile of user 215 and any other entity who may be associated with that account. In some cases, a single account with the service provider may be associated with multiple entities. Accordingly, the metadata included in the transaction history stored in DB 225 for each account may also include profile data collected for each entity associated with the account. Such profile data may include, but is not limited to, preferred account funding and payment options, a transaction history (e.g., payment information, receipts, other details related to each previous transaction), device information, and other information collected in response to completed funding and/or payment transactions. The device information may include, for example and without limitation, Internet Protocol (IP) addresses, location data, and other information identifying the device(s) used to complete the previous transaction(s). Account manager 226 may use the information stored in DB 225 for each account to match profiles with individual users/entities associated with that account. Account manager 226 may use the transaction history and metadata thereof, including profile data and attributes, associated with an account to verify the authenticity of any requests received from a device (e.g., user device 210) associated with the account.

In some embodiments, account manager 226 may provide an interface for agent 235 to view and update account information associated with user 215's account via a GUI of agent application(s) 232. Such information may include the transaction record with the text summary of communications received from user 215, as described above. In some implementations, agent application(s) 232 and the interface provided by account manager 226 may be part of a customer relationship management (CRM) platform associated with the service provider, e.g., as implemented by service provider server 220 or other server (not shown) that is communicatively coupled to service provider server 220 via network 202. Such a CRM platform may be used by the service provider to manage customer service requests and other user communications received via communication interfaces 222. The information collected by agent 235 and other customer service agents of the service provider may be used for product improvement and reporting purposes. In some cases, customer service metrics generated from this information may be used to train and improve the performance of individual customer service agents, as will be described in further detail below.

In addition to collecting information (e.g., notes or text summary) related to the user communications, agent 235 (and other agents) may use agent application(s) to classify communications received from user 215 (and other users) according to at least one category selected from a first set of feedback categories. In some embodiments, the first set of feedback categories may be a predefined list of categories displayed via a GUI of agent application(s) 232 at agent device 230. The classification of the user communications in this example may be stored along with the other account information associated with user 215's account in DB 225, as described above. In some cases, the classification of user 215's communications by agent 235 (similar classification of other users' communications by other agents of the service provider) may not accurately reflect the respective users' actual comments or reasons for their communications, e.g., due to human or machine error associated with selecting an appropriate category or having a predefined list that is limited to categories that may not accurately reflect the users' actual comments or reasons for initiating the communications with the service provider.

Therefore, to improve the initial classification of user communications performed by agent 235 (and other agents of the service provider), a user feedback auditor 228 of service provider server 220 may apply machine learning to the user feedback data to reclassify the corresponding user communications, as will be described in further detail below with respect to FIG. 3.

Figure 3:
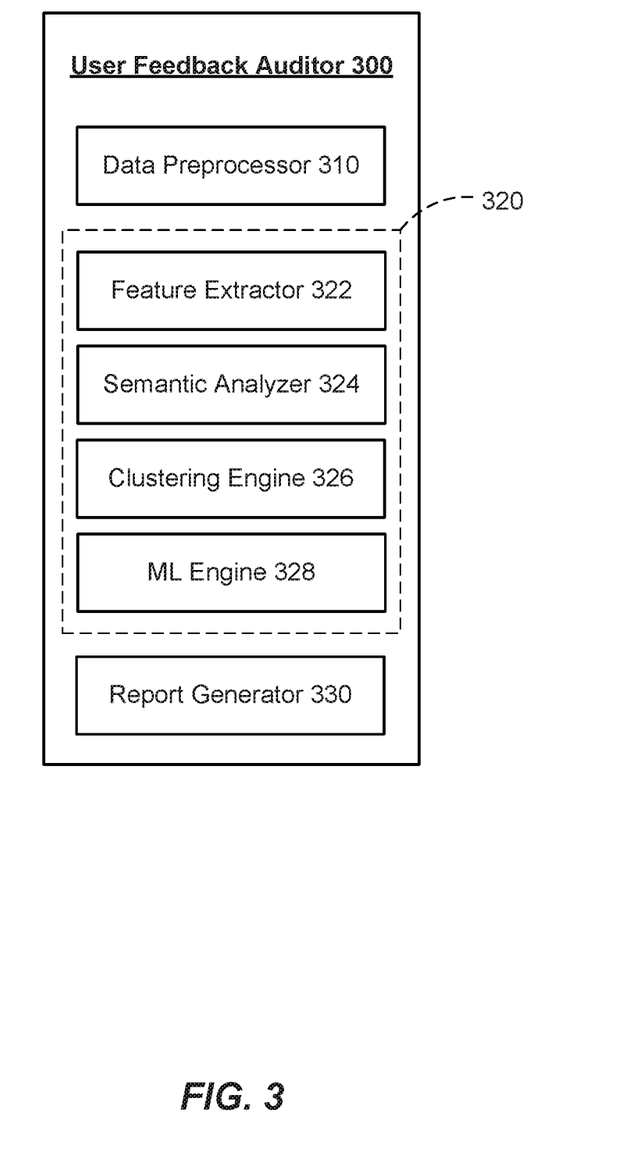
FIG. 3 is a block diagram of a user feedback auditing tool in accordance with an embodiment of the present disclosure.

FIG. 3 is a block diagram of a user feedback auditing tool (or user feedback auditor) 300 in accordance with an embodiment of the present disclosure. User feedback auditor 300 may be used to implement, for example, user feedback auditor 228 of service provider server 220 in system 200 of FIG. 2, as described above. As shown in FIG. 3, user feedback auditor 300 includes a data preprocessor 310, a feature extractor 322, a semantic analyzer 324, a clustering engine 326, a machine learning (ML) engine 328, and a report generator 330. In some embodiments, feature extractor 322, semantic analyzer 324, clustering engine 326, and ML engine 328, and classifier 328 may correspond to different components of a ML-based data classifier 320. Classifier 320 may be used, for example, to reclassify user feedback data corresponding to user communications that were previously classified, e.g., by customer service agents, like agent 235 of FIG. 2, as described above, of a service provider.

In some embodiments, a service provider server (e.g., service provider server 220 of FIG. 2, as described above) may receive user communications (e.g., emails, text messages, and/or phone calls) from different users over a network (e.g., network 202 of FIG. 2, as described above). The user communications may include text input received directly from users (e.g., including user 215 of FIG. 2) via one or more applications executable at the respective users' devices (e.g., including user device 210 of FIG. 2, as described above). In some cases, a user may submit a transaction claim including text comments to the service provider server 220 via email, text message, or a chat session through different communication channels or interfaces (e.g., communication interfaces 222 of FIG. 2, as described above). In other cases, the text input may be from a customer service agent based on a phone call with the user, as described above. The text comment may include a description of the user's reasons for the transaction claim. In addition to the text comments collected by the customer service agent, an audio recording of the telephone conversation with the user may be stored in a database (e.g., DB 225 of FIG. 2, as described above) with other information associated with an account of the user with the service provider. The user communications (including text and audio communications) may be stored as user feedback data including a first classification of the user communications according to a first set of feedback categories, e.g., as selected by the customer service agent from predefined categories, as described above.

In some embodiments, the service provider server may access and retrieve the user feedback data including any text and audio communications from the database for preprocessing by data preprocessor 310. Data preprocessor 310 may perform various data conversion or preprocessing operations on the user feedback data to prepare the data for processing by the components of ML-based data classifier 320 and use by ML models thereof. The data preparation may include, for example, generating an input file including the user communications in a data format associated with one or more ML models, as will be described in further detail below. The data format may be a text data format, and the operations performed by data preprocessor 310 may include performing voice-to-text transcription to convert any audio communications into text. The voice-to-text transcription may include, for example, using automatic speech recognition (ASR) software to convert one or more audio files, including the recorded voice communications from phone calls with customer service agents, into transcribed text (e.g., plain text file, text file).

In some embodiments, data preprocessor 310 may also perform one or more cleaning operations on the transcribed text to remove noise or unwanted information. The noise or information removed from the clean text data may include, for example and without limitation, punctuation marks, stop words (e.g., "a", "the", "is", "are", etc.), white spaces, contractions, special characters, accented words, and other non-substantive data. In some implementations, removing noise may also include additional operations, such as lowercasing (e.g., lowercasing the text of the text file), stemming (e.g., reducing inflection in words to their root form (e.g., "troubled" and "troubles" to "trouble")), lemmatization (e.g., transforming words to their root word (e.g., "trouble", "troubling", "troubled", and "troubles" would be mapped to "trouble")), and normalization (e.g., transforming text into a standard form (e.g., "2moro" to "tomorrow")). In some cases, the noise may be removed from the text data to improve the prediction accuracy of the machine learning models used by classifier 320, as will be described in further detail below.

In some embodiments, the preprocessed user feedback data may be provided as input to feature extractor 322. Feature extractor 322 may extract textual data features from the preprocessed feedback data to produce a first feature representation of the user feedback data. The operations performed by feature extractor 322 may include, for example, vectorizing the text data using sentence/word embedding algorithms to extract textual data features of the user communications, which may be used to identify patterns in the text data. Examples of sentence/word embedding algorithms that may be used for the text vectorization include, but are not limited to, such as binary term frequency, bag of words, term frequency-inverse document frequency (TF-IDF), continuous bag of words (CBOW), skip-gram (SG), one-hot encoding or count vectorization, word2vec, glove, fastText, embedding from language models (ELMo), transformers, etc.

In some implementations, feature extractor 322 may utilize a transformers-based word embedding algorithm to convert the preprocessed text, from the data preprocessor 310, into a vector(s) representing input features for training one or more machine learning models. The transformers-based word embedding algorithm may be context sensitive and use an attention mechanism to describe the connections and dependencies of each word in relation to other words in a sentence. Alternatively, feature extractor 322 may convert the preprocessed text into the vector(s) by using Bidirectional Encoder Representations from Transformers (BERT) word embedding techniques. In some cases, feature extractor 322 may combine textual data features and patterns to yield combined features, which may be inputted to the machine learning model(s).

The first feature representation of the user communications, including the extracted textual data features, generated by feature extractor 322 may be provided as input to semantic analyzer 324. In some embodiments, semantic analyzer 324 may be used to find the most common or frequently used words and/or phrases in the user communications. For example, semantic analyzer 324 may convert text strings identified in the first textual representation of the user communications into a plurality of N-grams (where "N" may be any positive integer). The N-grams may be, for example, a contiguous sequence of N words from the text string. The N-grams may then be used to find the most frequently used words/phrases in the user communications. The words/phrases may be organized or sorted according to their frequency, e.g., from a maximum to minimum frequency.

Semantic analyzer 324 may then perform a semantic search for additional words/phrases in the user communications that are semantically equivalent to some predetermined number of the most frequently used words/phrases (e.g., top 10, 15, or 100 words/phrases, based on the total number of words or N-grams). The semantic search may be performed using, for example, a machine learning framework (e.g., a deep neural network), which may be used to rank and sort individual words/phrases in the user communications according to their cosine similarity with the most frequent words/phrases. The results of the semantic search may be used to generate a second feature representation of the user communications from the first representation produced by feature extractor 322. The second feature representation may include a second set of textual data features (also referred to herein as "semantic features") extracted from the user communications, which include semantic equivalents of the first set of textual data features in the first representation.

In some embodiments, clustering engine 326 may cluster the user communications into a plurality of clusters based on the second set of textual data features in the second feature representation produced by semantic analyzer 324. Clustering engine 326 may use one or more clustering algorithms or models to generate the clusters. An example of such a clustering algorithm/model is Latent Dirichlet allocation (LDA). In some implementations, an LDA model may be used to perform a text analysis of the second set of textual data features to identify patterns in the user communications that correspond to a second set of feedback categories. The number of feedback categories identified by the LDA model may be based on, for example, a tuning parameter representing a predetermined maximum number of clusters. The second set of feedback categories may include, for example, additional categories that may be different from the first set of (predefined) feedback categories previously used to classify the user communications (e.g., based on the first classification with categories selected by customer service agents of the service provider, as described above).

ML engine 328 may then be used to reclassify the user communications to generate a second classification of the user communications according to the second set of feedback categories that correspond to the plurality of clusters generated by clustering engine 326. In some implementations, ML engine 328 may determine an intent of each of the user communications from extracted features associated with each of the interactions using the machine learning-trained classifier. In turn, ML engine 328 may classify each of the communications as corresponding to a respective category of the second set of feedback categories based at least in part on the intent of that communication. In some embodiments, ML engine 328 may select one of a plurality of ML models corresponding to different ML-trained classifiers for the ML-based data classifier 320. In some embodiments, ML engine 328 train each ML model in the plurality of machine learning models to reclassify the user communications based on the second feature representation.

In some implementations, ML engine 328 may generate multiple ML models that are based on or correspond to the second set of feedback categories. ML engine 328 may be adapted to train each of the ML models with respective training datasets to form different ML-trained classifiers. The respective training datasets may facilitate, for example, supervised learning by including labeled interaction data indicating what information in the user communications pertains to which of the feedback categories. When generating each ML-trained classifier, the features in the training datasets may be used to generate different layers of the ML model used for the classification, which may include different nodes, values, weights, and the like. ML engine 328 may utilize a supervised machine learning algorithm, function, or technique that utilizes continuous and/or iterative learning to generate the model. In some implementations, the ML model may be implemented as a deep learning network, including a convolution neural network, a recurrent neural network, or a deep neural network.

In some implementations, the ML models may be trained using one or more statistical modeling techniques to produce ML-trained statistical models. Examples of such statistical modeling techniques include, but are not limited to, linear regression, logistic regression, random forests, support vector machines (SVMs), decision trees, and Bayesian networks. For example, SVMs may be used by ML engine 328 to implement one or more of the ML models. SVMs are a set of related supervised learning methods used for classification and regression. An SVM-based training algorithm (e.g., a non-probabilistic binary linear classifier) may build a model that predicts whether a new example falls into one category or another. As another example, Bayesian networks may be used to implement machine learning. A Bayesian network is an acyclic probabilistic graphical model that represents a set of random variables and their conditional independence with a directed acyclic graph (DAG). The Bayesian network could present the probabilistic relationship between one variable and another variable.

ML engine 328 may then select at least one of the trained ML models based on a comparison of performance metrics between each of the ML-trained classifiers. The performance metrics may include, for example, confidence scores computed by ML engine 328 for respective classifications of the user communications generated by the plurality of trained ML models.

When training each ML model, ML engine 328 may utilize feedback and annotations or labeling from an agent device (e.g., agent device 230 of FIG. 2, as described above) or the device of a customer agent supervisor (not shown) to iteratively train the model. For example, user communications in the training data set and/or other data sets may be flagged using the machine learning technique to identify different categories of relevant feedback data, where the supervisor's device may send an indication that the flagged communications were previously misclassified. The identification of such misclassified communications may be used to retrain the ML model in a continuous or iterative training process so that incorrect classifications may be reduced and/or eliminated, and the ML model may more accurately classify user communications. Thus, the ML model may be trained for classification of new user communications, as well as review previous classifications performed by customer service agents or existing ML models.

In some embodiments, report generator 330 may be used to generate a report that can include statistics on the number of user communications that were classified differently in the second classification by the trained ML model (as selected by ML engine 328) relative to the first classification by the customer service agents. The report may be transmitted to the customer agent supervisor's device as part of a set of performance metrics for the individual customer service agents. The report may include, for example, an agent identifier for each customer service agent along with statistics on the number of user communications previously classified by the agent that were reclassified by the ML model. The report may be used by the supervisor to identify which agents are misclassifying user communications and the frequency of such misclassifications. Such statistics may then be used for agent training, e.g., by providing feedback to those customer service agents who frequently misclassify user communications, to improve customer service overall.

In some implementations, report generator 330 may generate a different report indicating common user complaints or issues reported by users, based on the classification by ML engine 328 of user communications. Such a report may be generated, for example, when a predetermined number of complaints or communications (e.g., exceeding a threshold) associated with a particular feedback category is identified. The information included in the report may then be used by the service provider to identify and resolve any underlying issues or areas for improvement with respect to one or more features of its products and/or services.

As described above, user feedback auditor 300 may be used to implement user feedback auditor 228 of service provider server 220 in FIG. 2, e.g., as another service that operates alongside payment service 224 for reclassifying user feedback data relating to issues reported by users of payment service 224 via a customer service interface. In some embodiments, user feedback auditor 300 may be implemented as a standalone platform, e.g., at server 220 or another server communicatively coupled thereto, for auditing various types of user feedback data. In some implementations, such a platform may be used to provide an automated feedback analysis and classification functionality to an existing CRM framework or system associated with the service provider. The CRM system of the service provider may receive, for example, a large amount of user communications related to its products or services. As described above, such communications may include emails that are directed to a dedicated customer service email address associated with the service provider, phone calls received via a support hotline, and chat sessions initiated via a website of the service provider, etc. Processing through such a high volume of user communications manually is not feasible in terms of both time and resources. Thus, user feedback auditor 300 may be used to provide an automated feedback analysis and classification platform to automatically analyze and classify user communications (e.g., email, phone, chat, etc.) for producing actionable insights related to product/service issues, complaints, or general user comments.

In some embodiments, user feedback auditor 300 may be used to analyze and classify the user communications received by the service provider through various communication channels, as described above. Such communications may include, for example, conversations between users and customer service agents of the service provider. The conversations may be related to transaction claims or disputes submitted by the respective users. Each transaction claim may include a user's comment (e.g., text-based input, text-based electronic data) or reason for submitting the claim/dispute. For example, the comment may include text describing that items purchased from a merchant were never delivered, the items are defective, the items are substantially different than the merchant's description, the items were perished upon delivery, the items were not delivered on time, etc. The classification of such user comments may produce feedback categories representing the most common customer issues, which may not be evident from any manual or existing automated classification performed by the default CRM system.

To identify such hidden customer issues, user feedback auditor 300 may first preprocess the data using data preprocessor 310, e.g., by converting all audio or recorded voice communications into text using voice-to-text transcription and performing any data cleaning operations, as described above. User feedback auditor 300 may analyze the preprocessed data to find the most common words and phrases (e.g., using feature extractor 322 and semantic analyzer 324, as described above). Given that a transaction claim is about a particular topic, specific words can be expected to appear in the associated user communications more or less frequently. As an example, the words "dog" and "bone" may appear more often in user communications about dogs, "cat" and "meow" may appear more often in communications about cats, and "the" and "is" may appear equally in both sets of communications. User communications may also concern multiple topics in different proportions, for example, in a conversation that is 10% about dogs and 90% about cats, there would probably be about 9 times more cat-related words than dog-related words.

The common words/phrases may then be used to perform a semantic search for specific topics and topic groups (e.g., using clustering engine 326). In some embodiments, user feedback auditor 300 may employ topic modeling, which includes a type of statistical modeling using machine learning for discovering the "topics" that occur in a collection of input documents or files, based on the common words or phrases. The "input documents" or "input files" in this example may be text-based files including user input and comments. The topics may correspond to new set of feedback categories that are discovered from analyzing the user communications. Thus, topic modeling can be used as a text-analysis tool for discovering latent semantic structures in a text body. The "topics" produced by topic modeling techniques may include clusters of similar words. A topic model captures this information in a mathematical framework, which allows for analyzing a set of input documents and discovering, based on the statistics of the words in each, what the topics might be and what each document's balance of topics is. As described above, Latent Dirichlet allocation (LDA) is an example of a topic model. As will be described in further detail below with respect to FIG. 4, the topics or new feedback categories discovered by user feedback auditor 300 may be used to train a machine learning model (e.g., using ML engine 328) and use the trained model to audit user feedback data by reclassifying the corresponding user communications according to the new set of feedback categories.

Figure 4:
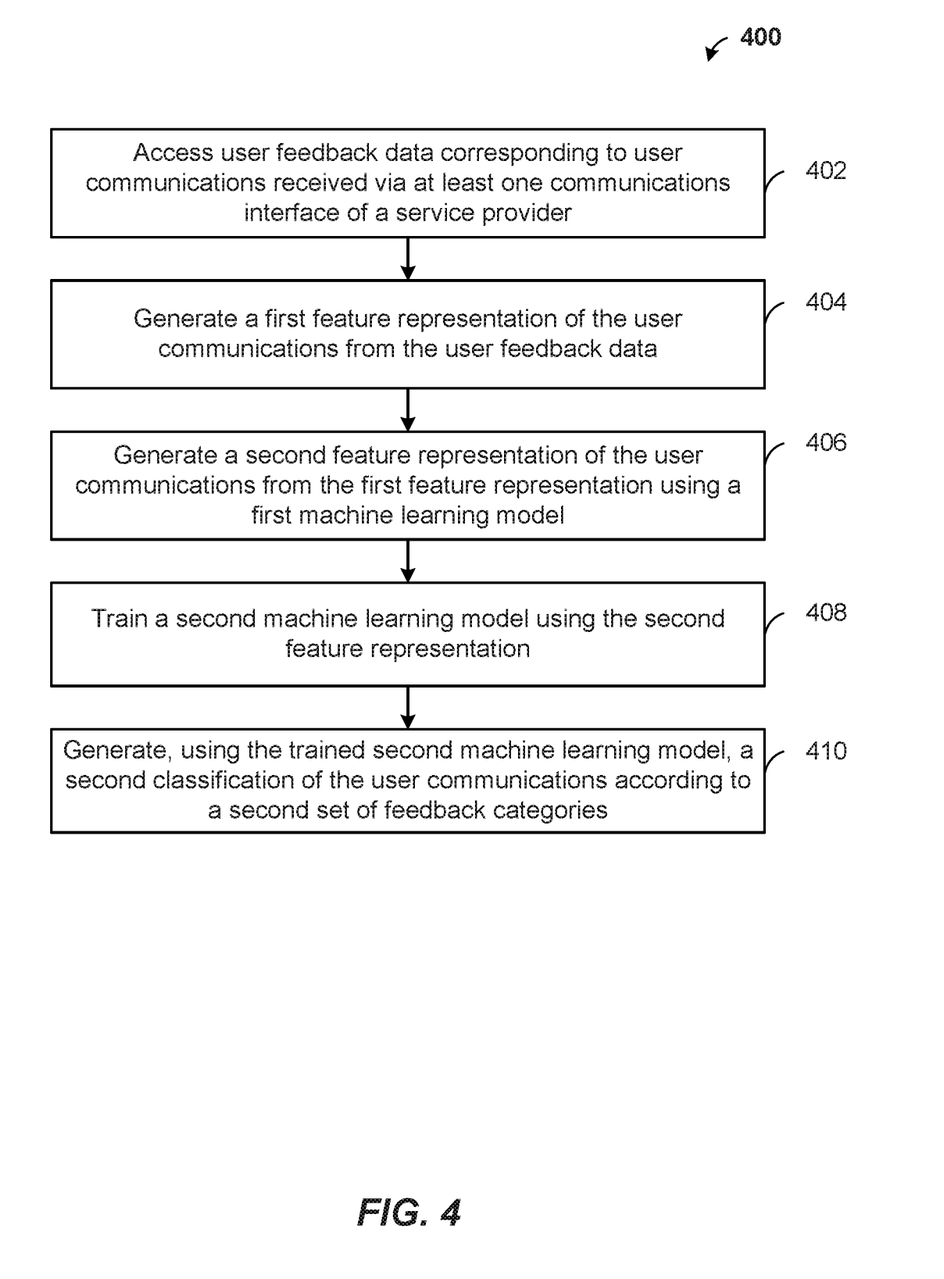
FIG. 4 is a flow diagram of a process for auditing user feedback data in accordance with an embodiment of the present disclosure.

FIG. 4 is a flow diagram of a process 400 for auditing user feedback data in accordance with an embodiment of the present disclosure. For discussion purposes, process 400 will be described using system 200 of FIG. 2 and user feedback auditor 300 of FIG. 3, as described above. However, process 400 is not intended to be limited thereto. Process 400 may be performed by, for example, user feedback auditor 228 of service provider server 220 in system 200 of FIG. 2 or user feedback auditor 300 of FIG. 3, as described above.

As shown in FIG. 4, process 400 begins in block 402, which includes accessing user feedback data corresponding to user communications (e.g., email, text, or phone calls)

received via at least one customer service interface of a service provider (e.g., communication interfaces 222 of service provider server 220 of FIG. 2, as described above). The user feedback data may include, for example, a first set of feedback categories associated with a first classification of the user communications. In some embodiments, the first classification may be a manual classification of the user communications performed by customer service agents, such as agent 235 of FIG. 2, of the service provider via their respective agent devices. The at least one customer service interface may include, for example, a customer support line for receiving phone calls from one or more users of the service provider. The user feedback data in this example may include audio files corresponding to voice communications between the user(s) and the customer service agents of the service provider via the customer support line interface.

Process 400 may then proceed to block 404, which includes generating a first feature representation of the user communications from the user feedback data. The first feature representation may include a first set of textual data features extracted from the user communications. In some implementations, the user feedback data may be preprocessed, e.g., by data preprocessor 310 of FIG. 3, as described above, prior to generating the first feature representation. The preprocessing may include, for example, converting each of the audio files into a text file including a transcription of the corresponding voice communications received from the user(s), e.g., as recorded during the phone calls with the service agents via the customer support line interface. The text file in this example may then be vectorized using a word embedding algorithm. The first set of textual data features may then be extracted from the vectorized text file. The vectorization and feature extraction operations may be performed by, for example, feature extractor 322 of FIG. 3, as described above.

In block 406, a second feature representation of the user communications may be generated from the first feature representation using a first machine learning (ML) model. The second feature representation may include, for example, a second set of textual data features extracted from the user communications. The second set of textual data features may include semantic equivalents of the first set of textual data features. In some embodiments, the first ML model may use a deep learning framework to identify the semantic equivalents of the first set of textual data features within the user communications. The second set of textual data features, including the identified semantic equivalents, may then be extracted from the user communications. The operations in block 406 may be performed by, for example, semantic analyzer 324 of FIG. 3, as described above.

In block 408, a second machine learning model is trained using the second feature representation generated from the first machine learning model. In some embodiments, block 408 may include clustering the user communications into a plurality of clusters using one or more clustering algorithms. Each of the plurality of clusters may correspond to a different one of the feedback categories in the second set based on a unique pattern of the second set of textual features within the user communications. The clustering operations in block 408 may be performed by, for example, clustering engine 326 of FIG. 3, as described above. The training operations may be performed by, for example, ML engine 328 of FIG. 3, as described above.

In block 410, the trained second machine learning model may be used to generate a second classification of the user communications according to a second set of feedback categories. Examples of such feedback categories include, but are not limited to, customer complaints or reports about various product or service features not working properly, queries for information regarding products and/or services associated with the service provider, and feature requests or suggestions to improve features of products and/or services associated with the service provider, which may serve as feedback for the service provider to identify any underlying issues or areas for improvement in its products and/or services.

In some embodiments, the second machine learning model used to generate the second classification in block 410 may be selected from among a plurality of machine learning models. Each machine learning model may be trained to reclassify the user communications based on the second feature representation generated in block 406. A comparison of confidence scores computed for respective classifications of the user communications generated by the plurality of trained machine learning models may be performed. At least one of the trained machine learning models may then be selected as the second machine learning model based on the comparison. The at least one trained machine learning model that is selected may be used to generate the second classification of the user communications. The confidence score of the second classification may be the highest among the confidence scores of the respective classifications generated by the plurality of trained machine learning models.

Figure 5:
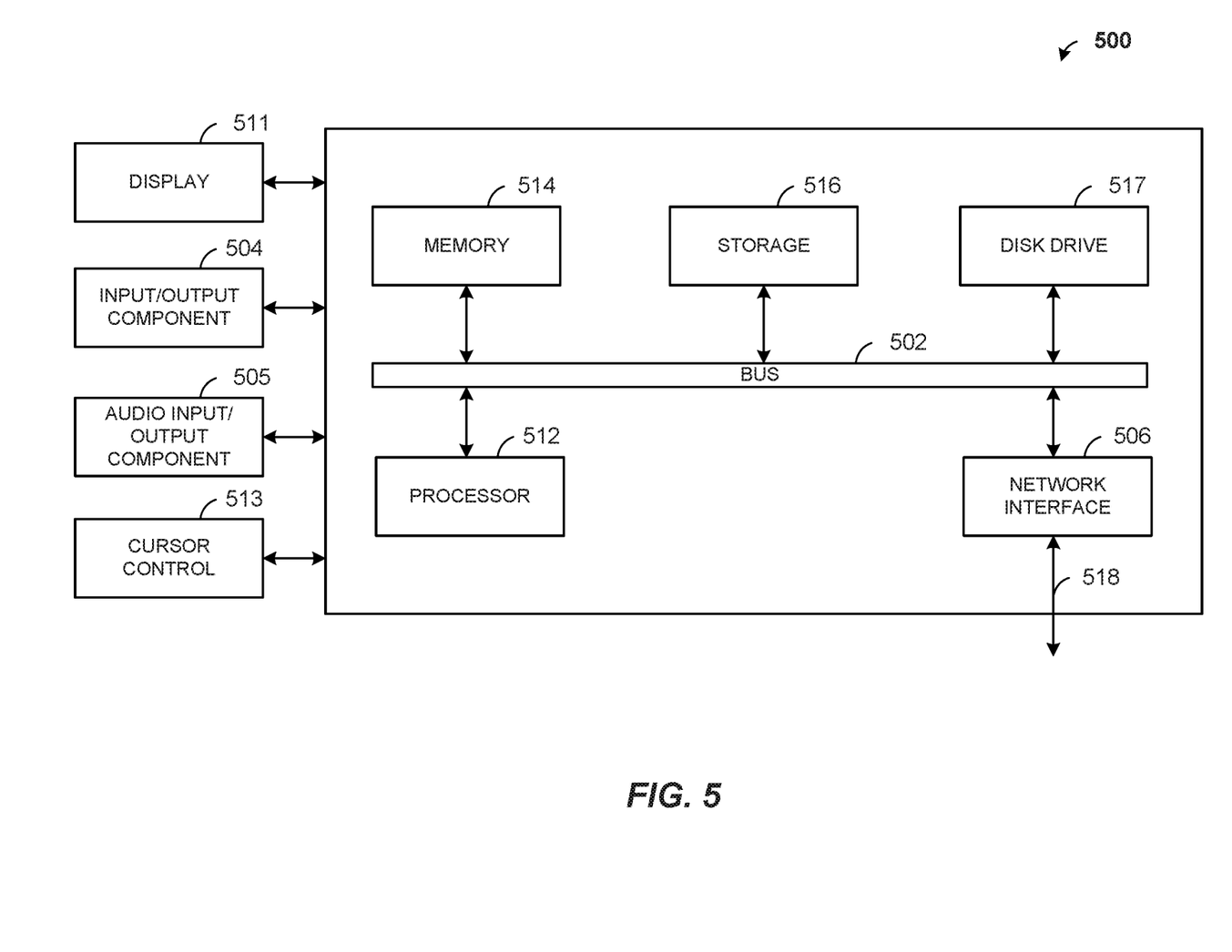
FIG. 5 is a block diagram of a computer system in which embodiments of the present disclosure may be implemented.

FIG. 5 is a block diagram of a computer system 500 in which embodiments of the present disclosure may be implemented. Computer system 500 may be suitable for implementing, for example, one or more components of the devices and servers in systems 100 and 200 of FIGS. 1 and 2, respectively, according to various implementations of the present disclosure. In various implementations, a client or user device may comprise a personal computing device e.g., smart phone, a computing tablet, a personal computer, laptop, a wearable computing device such as glasses or a watch, Bluetooth device, key FOB, badge, etc.) capable of communicating with a service provider over a network, e.g., network 102 or 202 of system 100 or 200, respectively. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a server (e.g., service provider server 220 of FIG. 2, as described above) via a network (e.g., network 202 of FIG. 2, as described above). In some implementations, the signal transmission may be wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various implementations, non-volatile media includes optical or magnetic disks, volatile media includes dynamic memory, such as system memory component 514, and transmission media includes coaxial cables, copper wire, and fiber optics, including wires that comprise bus 502. In one implementation, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various implementations of the present disclosure, execution of instruction sequences to practice the present disclosure may be performed by computer system 500. In various other implementations of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Although the various components of computer system 500 are described separately, it should be appreciated that the functionality of the various components may be combined and/or performed by a single component and/or multiple computing devices in communication with one another, as desired for a particular implementation.

Where applicable, various implementations provided by the present disclosure may be implemented using hardware, software, or combinations of hardware and software. Also, where applicable, the various hardware components and/or software components set forth herein may be combined into composite components that include software, hardware, and/or both without departing from the spirit of the present disclosure. Where applicable, the various hardware components and/or software components set forth herein may be separated into sub-components that include software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems that include one or more memories storing various information described herein and one or more processors coupled to the one or more memories and a network, wherein the one or more processors are operable to perform steps as described herein, as non-transitory machine-readable medium that includes a plurality of machine-readable instructions which, when executed by one or more processors, are adapted to cause the one or more processors to perform a method that includes steps described herein, and methods performed by one or more devices, such as a hardware processor, user device, server, and other devices described herein.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A system comprising:
one or more hardware processors; and
a non-transitory memory having stored therein instructions that are executable by the one or more hardware processors to cause the system to perform operations comprising:
accessing user feedback data corresponding to user communications received via at least one customer service interface of a service provider, the user feedback data including a first set of feedback categories associated with a first classification of the user communications;
generating a first feature representation of the user communications from the user feedback data, the first feature representation including a first set of textual data features extracted from the user communications;
generating, using a first machine learning model, a second feature representation of the user communications from the first feature representation, the second feature representation including a second set of textual data features extracted from the user communications, and the second set of textual data features including semantic equivalents of the first set of textual data features;
training a second machine learning model with the second feature representation generated from the first machine learning model; and
generating, using the trained second machine learning model, a second classification of the user communications according to a second set of feedback categories.

2. The system of claim 1, wherein the operations further comprise:
identifying, from the first machine learning model using a deep learning framework, the semantic equivalents of the first set of textual data features within the user communications; and extracting, from the user communications, the second set of textual data features including the identified semantic equivalents.

3. The system of claim 1, wherein the operations further comprise:
clustering the user communications into a plurality of clusters using one or more clustering algorithms, each of the plurality of clusters corresponding to a different one of the feedback categories in the second set based on a unique pattern of the second set of textual features within the user communications.

4. The system of claim 1, wherein the second machine learning model is selected from among a plurality of machine learning models, and wherein the operations further comprise:
training each machine learning model in the plurality of machine learning models to reclassify the user communications based on the second feature representation;
comparing confidence scores for respective classifications of the user communications generated by the plurality of trained machine learning models; and
selecting, from among the plurality of trained machine learning models, at least one trained machine learning model as the second machine learning model based on the comparison, wherein the at least one trained machine learning model is used to generate the second classification of the user communications, and the second classification has a highest confidence score from among the respective classifications generated by the plurality of trained machine learning models.

5. The system of claim 1, wherein the at least one customer service interface of the service provider is a customer support hotline for receiving phone calls from one or more users of the service provider, and wherein the user feedback data further includes audio files corresponding to voice communications between the one or more users and customer service agents of the service provider via the customer support hotline.

6. The system of claim 5, wherein the operations further comprise:
preprocessing the voice communications for use by at least one of the first machine learning model or the second machine learning model.

7. The system of claim 6, wherein the preprocessing comprises:
converting each of the audio files into a text file including a transcription of the corresponding voice communications.

8. The system of claim 7, wherein the preprocessing further comprises:
vectorizing the text file using a word embedding algorithm; and
extracting the first set of textual data features from the vectorized text file.

9. A method comprising:
accessing, by a computing device from a database, user feedback data corresponding to user communications received via at least one communications interface of a service provider, the user feedback data including a first set of feedback categories associated with a first classification of the user communications;
generating, by the computing device, an input file including the user communications in a data format associated with a first machine learning model;
extracting, using the first machine learning model, a plurality of semantic features of the user communications from the generated input file;
determining a second set of feedback categories for the user communications using a second machine learning model trained with the extracted plurality of semantic features; and
reclassifying the user communications according to the second set of feedback categories.

10. The method of claim 9, wherein the data format of the user communications in the input file is a text format, and wherein the input file includes a first feature representation of the user communications that includes a first set of textual data features extracted from the user communications.

11. The method of claim 10, wherein extracting the plurality of semantic features comprises:
generating a second feature representation of the user communications using the first machine learning model with the first feature representation, the second feature representation including a second set of textual data features extracted from the user communications, and the second set of textual data features including semantic equivalents of the first set of textual data features.

12. The method of claim 9, wherein the user communications include audio files corresponding to voice communications between one or more users and customer service agents associated with the service provider.

13. The method of claim 12, wherein generating the input file further comprises:
converting each of the audio files into a text file including a transcription of the corresponding voice communications; and
preprocessing the text file for use by the first machine learning model.

14. The method of claim 13, wherein the preprocessing comprises:
removing noise or unwanted information from the text file.

15. The method of claim 14, further comprising:
vectorizing the text file using a word embedding algorithm; and
extracting the first set of textual data features from the vectorized text file.

16. A non-transitory machine-readable medium having stored thereon machine-readable instructions executable to cause a machine to perform operations comprising:
accessing user feedback data corresponding to user communications received via at least one communications interface of a service provider, the user feedback data including a first set of feedback categories associated with a first classification of the user communications;
generating a first feature representation of the user communications from the user feedback data, the first feature representation including a first set of textual data features extracted from the user communications;
generating a second feature representation of the user communications from a first machine learning model based on the first feature representation, the second feature representation including a second set of textual data features extracted from the user communications, and the second set of textual data features including semantic equivalents of the first set of textual data features;
determining a second set of feedback categories for the user communications using a second machine learning model trained with the second feature representation; and generating, using the trained second machine learning model, a second classification of the user communications according to the second set of feedback categories.

17. The non-transitory machine-readable medium of claim 16, wherein the user feedback data further includes audio files corresponding to voice communications between users of the service provider and customer service agents associated with the service provider, and wherein the operations further comprise:
converting each of the audio files into a text file including a transcription of the corresponding voice communications;
vectorizing the text file using a word embedding algorithm; and
extracting the first set of textual data features from the vectorized text file.

18. The non-transitory machine-readable medium of claim 16, wherein the operations further comprise:
identifying, from the first machine learning model using a deep learning framework, the semantic equivalents of the first set of textual data features within the user communications; and
extracting, from the user communications, the second set of textual data features including the identified semantic equivalents.

19. The non-transitory machine-readable medium of claim 16, wherein the operations further comprise:
clustering the user communications into a plurality of clusters using one or more clustering algorithms, each of the plurality of clusters corresponding to a different one of the feedback categories in the second set based on a unique pattern of the second set of textual features within the user communications.

20. The non-transitory machine-readable medium of claim 16, wherein the second machine learning model is selected from among a plurality of machine learning models, and wherein the operations further comprise:
training each machine learning model in the plurality of machine learning models to reclassify the user communications based on the second feature representation;
comparing confidence scores for respective classifications of the user communications generated by the plurality of trained machine learning models; and
selecting, from among the plurality of trained machine learning models, at least one trained machine learning model as the second machine learning model based on the comparison, wherein the at least one trained machine learning model is used to generate the second classification of the user communications, and the second classification has a highest confidence score from among the respective classifications generated by the plurality of trained machine learning models.

* * * * *